United States Patent [19]
Will

[11] Patent Number: 4,514,790
[45] Date of Patent: Apr. 30, 1985

[54] RECHARGEABLE POWER PACK AND A POCKET LAMP FOR USE THEREWITH

[76] Inventor: Elmar Will, Makartstr. 9, D-8000 München 71, Fed. Rep. of Germany

[21] Appl. No.: 566,969

[22] Filed: Dec. 30, 1983

Related U.S. Application Data

[63] Continuation of Ser. No. 255,271, Apr. 17, 1981, abandoned.

[30] Foreign Application Priority Data

Apr. 21, 1980 [DE] Fed. Rep. of Germany ....... 3015248

[51] Int. Cl.³ ............................................... F21L 7/00
[52] U.S. Cl. .................................. 362/183; 362/205; 362/226; 320/57; 320/59
[58] Field of Search .................. 362/20, 95, 183, 205, 362/226; 320/2, 29, 53, 56, 57, 59

[56] References Cited

U.S. PATENT DOCUMENTS

| | | | |
|---|---|---|---|
| 3,109,132 | 10/1963 | Witte | 320/53 |
| 3,120,632 | 2/1964 | Hopt | 320/2 |
| 4,244,011 | 1/1981 | Hammel | 362/183 |
| 4,345,304 | 8/1982 | Penney | 362/183 |

FOREIGN PATENT DOCUMENTS 1093839 10/1957 Fed. Rep. of Germany .

Primary Examiner—Donald P. Walsh
Attorney, Agent, or Firm—Cushman, Darby & Cushman

[57] ABSTRACT

A rechargeable power pack or cartridge for flashlights and the like is made up of a housing, an accumulator, a rectifier and a plug structure for use with a public electricity supply outlet. Furthermore, the power cartridge has an adapter plug structure which may be used, for example, with the cigarette lighter outlet of a motor-vehicle so that the accumulator may be recharged with power from the battery of a motorvehicle or from the public electricity line.

7 Claims, 5 Drawing Figures

RECHARGEABLE POWER PACK AND A POCKET LAMP FOR USE THEREWITH

This is a continuation of application Ser. No. 255,271, filed Apr. 17, 1981, now abandoned.

BACKGROUND OF THE INVENTION

The present invention is with respect to a rechargeable low voltage power pack or cartridge having a housing, a rectifier, an accumulator and pins for use with a current outlet of a public electricity supply.

Such rechargeable low voltage power packs or cartridges have been used for some years as parts of flashlights, radios and the like.

Because such rechargeable low voltage power packs or cartridges are fixed in and made part of the apparatus to be powered thereby, no attempts have been made so far at designing such a rechargeable power cartridge as a separate unit, this being more specially because the design of the apparatus would then have to be changed specially for use with the unit. Furthermore, no attempt has been made as to designing a low voltage rechargeable power cartridge for use with an electricity supply other than the public supply, because such other supplies are only on hand to a limited degree and, when in the form for example of motorvehicle batteries, they quickly become run down.

Although electrical apparatus has been designed having a motorvehicle plug structure for connection with the vehicle's battery, such apparatus is then limited to the special voltage and current output from such a vehicle battery; it is only in the case of high-price and complex apparatus that there is any chance of switching over between 6 Volts and 12 Volts operation. In no such case, however, is the motorvehicle battery used for charging up a low voltage power pack with an accumulator for operation of apparatus using the power pack and, in fact, the motorvehicle battery itself is used for supplying the low voltage current so that operation of the apparatus is only possible when there is a connection with a motorvehicle battery.

Because, however, many forms of electrical apparatus are used in the home as well, as for example vacuum cleaners, lights, radios etc., it is then necessary for the separate forms of apparatus to be purchased twice over, and they may only be used with a public electricity outlet or with a motorvehicle battery. While it is true that such apparatus may be run on primary batteries, such batteries are quickly used up, so that operation therewith is high in price.

Because the electrical power as supplied for example by a motorvehicle battery is to be used as economically as possible because it is possible for the battery to be run down, such a power pack is only to be recharged from such a supply when the battery or the like is able to give the greatest amount of power or when no outlet of a public electricity supply is to hand.

SHORT OUTLINE OF THE INVENTION

The invention is based on the discovery that there is a need for a rechargeable low voltage power pack or cartridge, which may not only be recharged from the public electricity line, but furthermore from at least one other electricity supply as, more specially, the battery of a motorvehicle or a solar generator as for example on a boat, or any other energy supplies so as to make possible charging up of the power pack and not being dependent on the public electricity line all the time. With such a design, on the one hand, it is possible to make good use of the public electricity supply when it is on hand, while on the other hand, the low voltage power pack may be recharged by an other electricity supply without being dependent on the public one, for example when the user is on the road, by using the outlet in a motorvehicle, as for example the outlet for use with a cigarette lighter.

For this reason, one purpose of the invention is that of designing a rechargeable low current power pack, more specially for flashlights and of a pocket apparatus of the sort noted such that the power pack has a line plug structure and furthermore a plug or adapter structure for an other electricity supply without the power pack being made very much more complex and larger in size.

For effecting this purpose and other purposes, the power pack has an adapter plug structure running outwards from the housing and having a different design to the line plug structure and, furthermore, there is a charging circuit with which voltage supply to the adapter plug structure may be changed into charging current for the accumulator.

Further useful developments of the invention will be seen in the dependent claims.

Dependent on the functions desired of the apparatus by the user and the safety regulations of a given country, the rechargeable low voltage power pack may have separate plug structures, or such structures which are at least partly joined together mechanically, for the different sorts of connections desired with different electricity supplies. For making the account to be given simpler, in addition to the wording line plug structure, as used for connection with the public electricity system, the wording adapter plug structure is used for a further plug structure, which is different in design to the line plug structure so that it may be used with any other electricity outlets, more specially low voltage outlets such as for cigarette lighters in motorvehicles, and motorvehicle electrical outlets in general. The adapter plug structure may even be standardized for such purposes. If necessary, in such an adapter plug structure, there may be an integrated circuit so that it is more in line with the electrical conditions of the outlet in question.

One specially useful effect produced by the invention is to be seen in that the rechargeable low voltage power pack may be used as an integrated part of an overall apparatus without it being limited in this respect to one special form of apparatus, because different forms of apparatus, to be powered by the power pack, may be joined up with the power pack which has the plug structure, such apparatus being for example a flashlight, blower or fan, a photographic flash light system etc. so that the low voltage power pack of the present invention may be marketed as a system complete in itself or, furthermore, together with electrically powered systems for use therewith, with which it may be joined to the structure if desired.

LIST OF FIGURES

Further details and useful effects of the invention will be seen from the account now to be given of working examples, using the figures.

DETAILED DESCRIPTION OF WORKING EXAMPLES OF THE INVENTION

Figure 1:
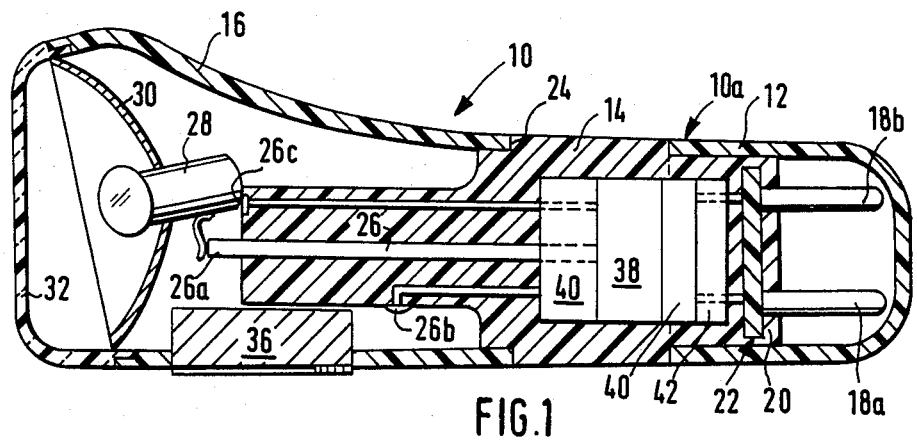
FIG. 1 is a partly diagrammatic lengthways section through a first working example—a low voltage power pack—of the invention as used for operation with a flashlight.

As will be seen in FIG. 1, a flashlight 10 is made up of three plugged-together parts, that is to say a guard cover 12, a low voltage power pack or cartridge 14 and a flashlight bodypiece 16. The guard cover 12 is kept on whenever no connection with an electrical outlet or socket of the public electricity system is desired, cover 12 guarding two plug pins 18a and 18b and furthermore making it simpler for the user to get a grip on the flashlight 10 in his hand. The plug pins 18a and 18b together with a base 20 (which may be pushed into the hollow of a European-type line outlet) take the form of a line plug structure 22, which is fully covered over by cover 12. The guard cover 12 is best kept in position on base 20 by having a tight fit. The base 20 may, or may not, have guide grooves. Base 20 is one part of the power pack 14, which, between the guard cover 12 and the flashlight bodypiece 16 makes up a part of the general outline of the housing (marked 10a) of the flashlight 10, this offering the useful effect that on gripping the power pack 14 in the hand, the guard cover or cap 12 may be put on (with the other hand) and pulled off as may be desired. The outer face of the low voltage power pack 14 and that of the flashlight bodypiece 16 are in line with each other where they come together, a separating line 24 marking the join between them, the two parts looking as if they are part of a single unit. Within the flashlight bodypiece 16 there is, in the present example of the invention, an adapter plug structure 26, forming a single unit with the power pack 14 and which, as we will see later in the present account, is furthermore used for the supply of current to a bulb 28 placed in the middle of a reflector 30 at the front part 32 of flashlight bodypiece 16. The front part 32 has a glassclear or at least translucent material for the light coming from bulb 28 to be flashed in the desired direction. Furthermore, in the flashlight bodypiece 16 there is a switch 34 of normal design (not detailed) and a fixing magnet 36 which do not have to be detailed here. It is, however, important on gripping the flashlight bodypiece 16 in one hand and the power pack or cartridge in the other hand, that the two may be pulled apart because of their being only force-fitted together like the force-fit between the guard cover 12 and the low voltage power pack 14. When this is done, the adapter plug structure 26 is pulled out clear of the flashlight bodypiece 16 and uncovered so that the low voltage power pack 14, having the guard cover 12 on it, may be taken in the hand and the adapter plug structure 26 may be plugged into an outlet of the right sort such as the cigarette lighter outlet of a motorvehicle. Within the low voltage power pack or cartridge 14 there is an accumulator 38, which may be recharged by way of a recharging circuit marked diagrammatically at 40. If public safety regulations are such that a contact of the adapter plug structure 26 is not to be uncovered when the guard cover 12 is pulled off the plug base 20 and the plug pins 18a and 18b are plugged into a line outlet, it is for example possible to have a two-poled automatic overcurrent switch 42 between the recharging circuit 40 and the adapter plug structure 26, although however, any such switch 42, as may be seen from the figure as well, may be placed at any other desired position in the power pack 14 if there is no danger of getting a shock from the adapter plug structure 26. In place of an automatic overcurrent switch 42, it is furthermore possible to have a transformer.

On plugging in the two plug pins 18a and 18b in the outlet of a public electricity supply, current will be able to make its way by way of circuit 40 to accumulator 38 for recharging the same. On plugging the adapter plug structure 26 into an adapter outlet, as for example in the present case the cigarette lighter connection of a motorvehicle, recharging of the accumulator takes place by way of a front contact 26a and a side contact 26b, the last-named furthermore being joined up with accumulator 38 by way of the recharging circuit 40. In the case of the present example, the output of current again takes place by way of front contact 26a, joined with the accumulator 38 directly, and by way of a second contact 26c, again joined directly with accumulator 38, said contact 26c only being used as a current output connection. On these lines the adapter plug structure may be used not only for recharging the low voltage power pack 14, but furthermore discharging it.

The working example of the invention to be seen in FIG. 1 is simple and may put up with rough use. It does, however, have the shortcoming that the adapter plug structure 26 and the line plug structure 22 are positioned at opposite ends of the low voltage power pack 14, this fixing a lower limit for the overall size of the system. On the other hand, it is out of line with the safety regulations in most countries inasfar as on recharging from the public electricity line there is a chance of touching the uncovered metal contacts 26a, 26b and 26c of the adapter plug structure 26. These shortcomings are taken care of in the working example of the invention of FIG. 2.

Figure 2:
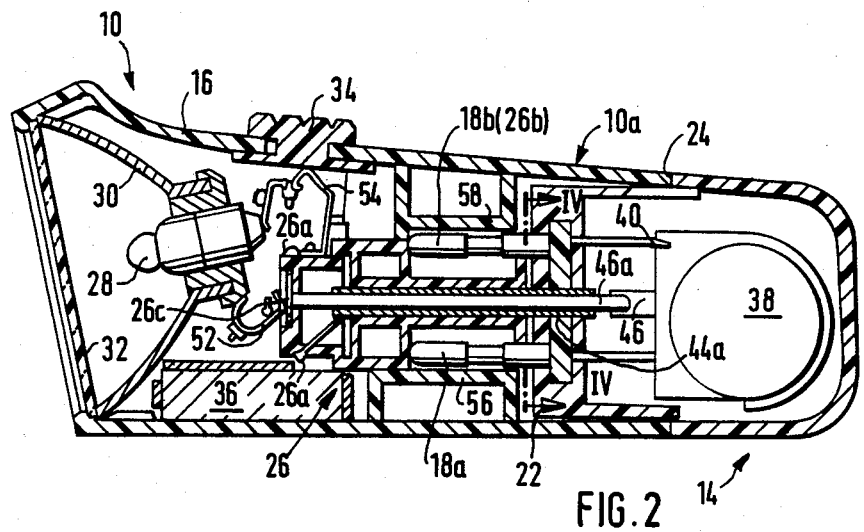
FIG. 2 is a section on the line II—II of FIG. 3 through a further example of a low voltage power pack of the invention for use with a flashlight.
Figure 3:
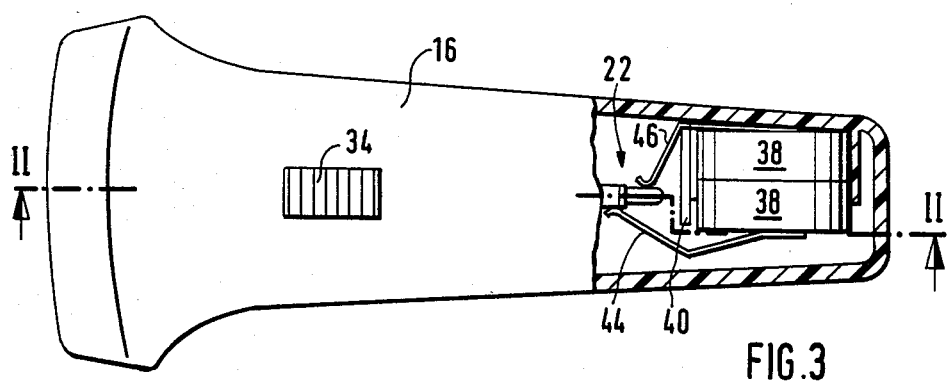
FIG. 3 is a view, partly in section, looking down on the flashlight of FIG. 2 with a power pack.

In the case of FIGS. 2 and 3, to give a more straightforward picture, parts which are the same in FIGS. 1, 2 and 3 are given the same part numbers. The plug pins 18a and 18b are changed from the position of FIG. 1 so that they are at the same end of the low voltage power pack 14 at which the adapter plug structure 26 is placed so that the accumulator 38 together with the recharging circuit 40 of the low voltage power pack 14 take the form of the end, opposite to the flashlight bodypiece 16, of flashlight 10 and the guard cover 12 may not be pulled off the low voltage power pack 14 and may in fact be made in a single piece with it, it only being possible to see a separating line 24 going round the structure between the flashlight bodypiece 16 and the outline of the low voltage power pack 14 or, in the other case, the guard cover 12.

The adapter plug structure 26 is, however, in this case designed as a separate unit, which may be separated from the line plug structure 22. As will be seen from FIG. 2, the design may be such in this case that there are elastic locking parts 56 and 58, which are gripped and pushed together by the fingers of the user of the flashlight and, when so forcefully gripped and bent by pushing on the housing 10a of the flashlight 10, the adapter plug structure 26 is gripped in the flashlight bodypiece 16 so that only the low voltage power pack 14 with the line plug structure 22 having pins 18a, 18b is pulled out or, however, the adapter plug structure 26 may be let go of so that, on pulling out the power pack 14 the plug structure 26 is kept back by friction thereon. Putting it differently, with this design, it is possible to make certain that the adapter plug structure 26 may be kept seated in the flashlight bodypiece 16 or on the line plug structure 22 as desired when the low voltage power pack 14 is pulled clear of the flashlight bodypiece 16 and the adapter plug structure 26 is not completely separated from the rest of the system so that the loss thereof becomes unlikely.

Figure 4:
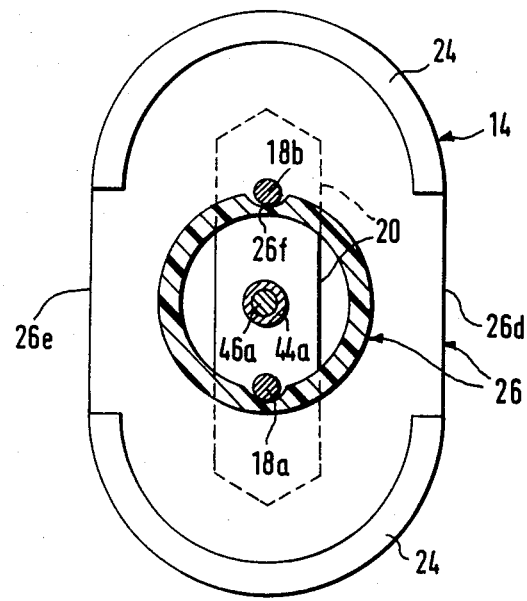
FIG. 4 is a section on the line IV—IV of FIG. 2 to make clear a change in the design of the power pack.

This may be made even simpler in the working example of FIG. 4 without parts of the housing 10a having to be made elastic so that they may be moved in any way for driving the locking parts 56 and 58; that is to say the adapter plug structure is designed forming parts of the outer face of housing 10a so that it may be gripped at this position by the fingers of the flashlight user touching them. These parts, which, for example, may be toothed on their outer faces, of the adapter plug structure 26 are marked 26d and 26e in FIG. 4 and are placed oppositely to each other on the two sides of housing 10a. It is then possible if the parts 26d and 26e are to be gripped for the flashlight user in the one or the other hand or not as desired so that the adapter plug structure 26 is pulled off with the low voltage power pack or cartridge 14 or with the flashlight bodypiece 16. In this respect, it is possible for the fits to be so designed that the adapter plug structure 26 is kept, for example, in the flashlight bodypiece 16 when the gripping parts 26d and 26e are not gripped at all by the user's fingers.

By way of two spring contact conductors 44 and 46 (FIG. 3), the accumulator 38 is joined up with conductors 44a and 46a, which are run through the line plug structure 22, without making electrical contact, as far as the front part of the adapter plug structure 26. In the case of the present working example the conductor 46a takes the form of a pin concentrically positioned in the adapter plug structure 26, the pin being insulatedly placed in a hollow pin taking the form of conductor 44a so that, on plugging the adapter plug structure 26 in to the line plug structure 22, the system to be seen in FIG. 3 with contacting of the spring contacts 44 and 46 will be produced. Conductor 44a makes its way to the front contact 26a of the adapter plug structure, the contact 26a in the case of FIG. 2 being formed by a bare ring conductor near the front end of the adapter plug structure 26, which, on being plugged into a cigarette lighter outlet of a motorvehicle, makes direct contact with the spring contact at the inner end of such outlet. Conductor 46a may be at the end of the adapter plug structure 26 but, however, is so arranged that no contact therewith is produced on plugging it in to the cigarette lighter outlet.

Figure 5:
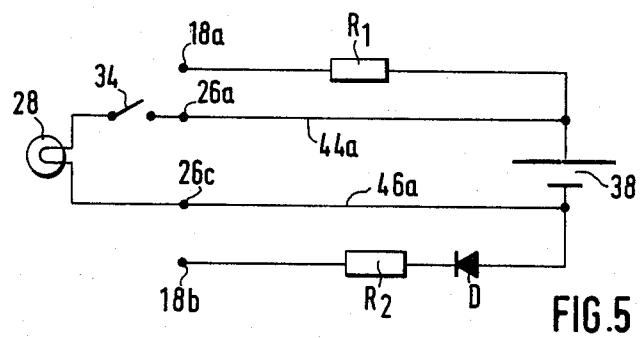
FIG. 5 is a schematic of electrical connections used for making up the circuit in FIG. 2 in two conditions, that is to say recharging of the power pack and discharging.

As will be seen more specially from FIG. 5, conductors 44a and 46a are directly joined up with the accumulator 38 and are used for supply of bulb 28, such conductors making contact with the spring contacts 52 and 54 within the flashlight bodypiece 16 when the low voltage power pack 14 with the adapter plug structure 26 is pushed into the flashlight bodypiece 16. Contact 54 is joined up in a known way by way of a switch 34 for turning the bulb on and off.

The plug pins 18a and 18b are kept joined up with the recharging circuit 40 at all times and by way of it they are joined up with the accumulator 28 so that, by way of a rectifying diode D and two resistors $R_1$ and $R_2$, recharging of the accumulator 38 from the public electricity supply is possible. For this purpose, in the present example, resistor $R_1$ with a value of, for example 10 Kohm is used for producing the necessary voltage drop from the high line voltage to the recharging voltage for accumulator 38. The plug pin 18b is used in the way to be detailed shortly at the same time as a side contact of the adapter plug structure 26, that is to say taking the place of contact 26b in FIG. 1 so that the recharging of the accumulator 38 takes place by way of the adapter plug structure 26 from the plug pin 18b by way of the resistor $R_2$ to the front contact 26a. Resistor $R_2$ is made with a representatively lower value of for example 500 ohm, when, as in the case of a motorvehicle battery, the supply voltage, the voltage coming in by way of the adapter plug structure 26, is representatively lower than the voltage coming from the public electricity line. In this respect recharging may be undertaken from 6 Volt or 12 Volt motorvehicle batteries in which respect the charging time with 12 Volts is half as long as that using 6 Volts.

It will be seen from FIGS. 2 and 4 how the plug pin 18b is used for forming the side contact of the adapter plug structure 26. The design is such that the adapter plug structure 26 is one-sided in relation to the line plug structure 22 so that the plug pin 18a comes to take up a position within the side limit of the adapter plug structure 26 while, on the other hand, the plug pin 18b is without it so that it makes side contact and, as will be seen from FIG. 4, the design may be such that the plug pin 18a is taken up within a groove, shut off from the outside while the other plug pin 18b is within a groove 26f for guiding purposes in the outer face of the adapter plug structure 26 so that it is forced into the desired uncovered position, possibly by being bent, when the adapter plug structure is forced on to the line plug structure 22. In addition to the fact that with this design a separate side contact 26b of the adapter plug structure is not necessary (this being important in the case of such mass produced apparatus) the use of the plug pin 18b for forming the side contact of the adapter plug structure 26 is specially useful in those cases, as with many normally used cigarette lighter outlets in motorvehicles, the diameter of the adapter plug structure 26 is only slightly different to the distance between the plug pins 18a and 18b for the line socket. In this case, trouble would be likely if an attempt were made at covering up the two plug pins 18a and 18b circumferentially when the adapter plug structure 26 is put in position so that no electrical side contact would be formed by the plug pins. This is not necessary if the plug pin 18b is designed markedly sticking out past the limit at the side of the adapter plug structure 26, the other plug pin 18a being able to be positioned without any side contact and without any shortcomings in this respect.

I claim:

1. A hand-held electrical device comprising a first detachable portion containing a rechargeable power pack and a pair of contact pin means electrically connected to said power pack and for connection to an AC current source to recharge through circuit means said power pack when said first detachable portion is separated from said electrical device, said first detachable portion having a third contact means connected to said power pack for bypassing said circuit means, a second detachable portion having a first section having separate first and second contact means, said first contact means for contacting one of said pin means and said second contact means for contacting said third contact means of said first detachable portion, said second detachable portion having third and fourth contact means each disposed relative to each other to provide, when said first and second portions are attached, a circuit for connection through said third and fourth contact means to a DC current source to recharge said power pack of said first detachable portion, a housing including spaced first and second contact means which control the operation of said electrical device and which are positioned to engage respectively with said second detachable portion when said second detachable portion is attached to said housing whereby a circuit will be established from said power pack to said electrical device through said second detachable portion.

2. The invention as claimed in claim 1 wherein said first contact means for said second detachable portion extends from one end of said second detachable portion with said second contact means extending from a side thereof with said second detachable portion being adapted for a current outlet in a motor vehicle.

3. The invention as claimed in claim 1 wherein said device has two ends with said first detachable portion being located at one end and said second detachable portion being located between said electrical device and said first detachable portion.

4. The invention as claimed in claim 3 wherein an automatic overcurrent switch is provided between said first and second detachable portions.

5. The invention as claimed in claim 1 wherein said second detachable portion is provided with an insulated surface having a groove into which at least one of said contact pin means of said first detachable portion is disposed when said second detachable portion is connected to said first detachable portion.

6. The invention as claimed in claim 1 wherein said electrical device is a flashlight including a flashlight body piece having a reflector and a bulb, said body piece being shaped to be joined with an end of said second detachable portion.

7. The invention as claimed in claim 6, wherein said second detachable portion is designed to be joined up with a force fit with said bodypiece or said power pack at the desire of the user.

* * * * *